United States Patent [19]

Heiss

[11] 4,250,106
[45] Feb. 10, 1981

[54] PROCESS FOR THE PREPARATION OF SUBSTANTIALLY PURE CYCLO ALIPHATIC DIISOCYANATE STEREOISOMERS

[75] Inventor: Herbert L. Heiss, New Martinsville, W. Va.

[73] Assignee: Mobay Chemical Corporation, Pittsburgh, Pa.

[21] Appl. No.: 84,484

[22] Filed: Oct. 15, 1979

Related U.S. Application Data

[62] Division of Ser. No. 8,450, Feb. 1, 1979.

[51] Int. Cl.$^3$ ........................................ C07C 119/045
[52] U.S. Cl. ........................ 260/453 SP; 260/453 A; 528/45; 528/48
[58] Field of Search ...................... 260/453 A, 453 SP

[56] References Cited

U.S. PATENT DOCUMENTS

| | | | |
|---|---|---|---|
| 2,965,614 | 12/1960 | Shashoua | 260/77.5 |
| 3,048,566 | 8/1962 | Beaman | 260/77.5 |
| 3,163,624 | 12/1964 | Black et al. | 260/77.5 |
| 3,450,676 | 6/1969 | Grogler et al. | 260/77.5 |
| 3,644,459 | 2/1972 | Cross | 260/453 A |

OTHER PUBLICATIONS

Corfield et al., Chemical Communications, No. 4, pp. 85-86, (1966).

*Primary Examiner*—Dolph H. Torrence
*Attorney, Agent, or Firm*—Gene Harsh; Joseph C. Gil; R. Brent Olson

[57] ABSTRACT

The instant invention is directed to a novel process for the separation of substantially pure cycloaliphatic diisocyanate reactive (cis-form) stereoisomers from cycloaliphatic diisocyanate non-reactive (trans-form) stereoisomers comprising reacting cycloaliphatic diisocyanates of the formula

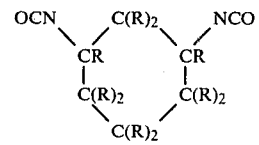

where R can be hydrogen or an aliphatic hydrocarbon group having from 1 to 4 carbon atoms, at least one of said R's being an aliphatic hydrocarbon having from 1 to 4 carbon atoms and wherein the isocyanato groups are both positioned axially or equatorially in the presence of catalysts selected from the group consisting of lead catalysts, tertiary amines, alkali metal hydroxides and sodium methoxide, thereby producing a cyclic nylon-1 type linear polymer having regularly reoccurring bicyclic structural units of the formula

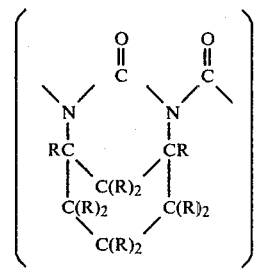

precipitating said cyclic nylon-1 type linear polymers, filtering and washing said precipitated cyclic nylon-1 type linear polymers, then decomposing said precipitated polymer using distillation, thereby producing a distillate and collecting said distillate containing a substantially pure monomer consisting of reactive (cis-form) stereoisomers. The instant invention also relates to the novel process outlined above wherein the decomposition by distillation is performed under conditions of reduced pressure.

2 Claims, No Drawings

PROCESS FOR THE PREPARATION OF SUBSTANTIALLY PURE CYCLO ALIPHATIC DIISOCYANATE STEREOISOMERS

This application is a division of my copending application Ser. No. 008,450 filed Feb. 1, 1979.

BACKGROUND OF THE INVENTION

It is well known that organic isocyanates may be polymerized to high molecular weight linear organic polymers. Thus, e.g. in U.S. Pat. No. 2,965,614, a process is described wherein an isocyanate in which the isocyanate group (or groups) is attached to a carbon atom bearing at least two hydrogen atoms is treated under anhydrous conditions with an alkali metal anionic catalyst at a temperature below about $-20°$ C. in a solvent for the isocyanate and the catalyst. The products are described as being linear polymers.

Similarly, in U.S. Pat. No. 3,163,624, trimethylene diisocyanate or alkyl and/or aryl substituted trimethylene diisocyanates are treated with an alkali metal anionic catalyst at a temperature of from about $-20°$ C. to about $-100°$ C. or lower to produce a linear polymer containing 6-membered rings.

In U.S. Pat. No. 3,048,566, a high molecular weight synthetic linear polymer of an organic polyisocyanate having at least two vicinal isocyanate groups is described. The polymer is characterized by a repeating five-membered ring structural unit in which the nitrogen of one of the isocyanate groups is bonded to the carbon atom of an adjacent isocyanate group. The products are made by polymerizing the isocyanate under anhydrous conditions at a temperature below about 75° C. The polymers may be depolymerized by thermal cracking. Example III of this patent describes the polymerization of cyclohexane-1,2-diisocyanate. A similar polymerization process is found in U.S. Pat. No. 3,450,676.

Finally in Corfield and Crawshaw, *Chemical Communications*, Vol. 4, pages 85-86 (1966), the polymerization of cis 1,3-cyclohexane diisocyanate is described. The process used consists of treating the isocyanate with sodium cyanide in a dimethyl formamide solution at a temperature of from $-40°$ C. to $-60°$ C. The resultant polymer unit is described as

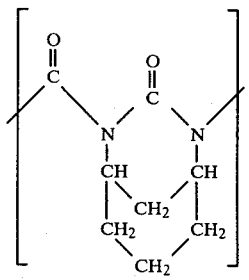

DESCRIPTION OF THE INVENTION

The instant invention is directed to novel heterocyclic nylon-1 type linear polymers and to the novel method of their manufacture. The novel polymers herein comprise regularly recurring bicyclic structural units having the general formula:

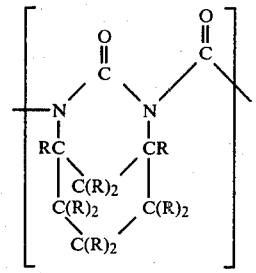

where R can be hydrogen or an aliphatic hydrocarbon group of from 1 to 4 carbon atoms, at least one of said R's being an aliphatic hydrocarbon group of from 1 to 4 carbon atoms, and wherein said polymers contain from 2 to 100 of said recurring structural units. In general, the polymers of the instant invention will have number average molecular weights of from about 500 to about 35,000.

The novel process herein comprises reacting certain specified cycloaliphatic diisocyanates in the presence of specified catalysts at a temperature of from about 50° C. to about 150° C. The isocyanates useful in the instant invention are generally of the formula:

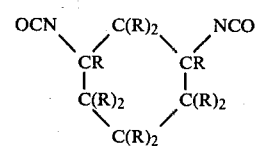

where R is hydrogen or an aliphatic hydrocarbon group of from 1 to 4 atoms, at least one of said R's being an aliphatic hydrocarbon of from 1 to 4 carbon atoms. Specific useful cycloaliphatic diisocyanates include 1-methyl-2,4-diisocyanato-cyclohexane, 1-methyl-2,6-diisocyanato-cyclohexane, 1-ethyl-2,4- and 2,6-diisocyanato-cyclohexane, 1,3-dimethyl-2,4- and 2,6-diisocyanato cyclohexane, and mixtures thereof. The presently preferred isocyanates are 1-methyl-2,4- and -1-methyl-2,6-diisocyanato-cyclohexane and mixtures thereof. Also useful and preferred are mixtures of hydrogenated 2,4- and 2,6-toluene diisocyanate. Finally, the isocyanato groups must be positioned both axial or both equatorial since it has been found that the reaction will not proceed when one is axial and the other equatorial.

The catalysts useful in the instant invention include lead catalysts such as lead octoate, lead laurate, lead oleate, lead napthenate, and the like; tertiary amines such as dimethylaminoethanol, triethylene diamine, N,N,N',N'-tetramethylethylene diamine, N,N-dibutyl urea, and the like; alkali metal hydroxides such as sodium hydroxide, potassium hydroxide and the like; and sodium methoxide.

It is generally preferred to conduct the polymerization in the presence of an inert solvent. For this purpose, useful solvents include hydrocarbons such as xylene, halogenated aliphatic or aromatic hydrocarbons such as methylene chloride, chloroform, trichloroethylene, chlorinated benzene, ketones such as acetone, methyl ethyl ketone, diethylketone, esters such as ethyl acetate, butyl acetate, glycol monomethyl ether acetate, glycol monoethyl ether acetate and ethers such as tetrahydrofuran and dioxane and mixtures thereof. The presently preferred solvent is xylene.

In general, the components are merely mixed together and heated to from about 50° C. to about 150° C. for from 5 minutes to about 96 hours. The catalyst is generally used in amounts ranging from 0.001 to 1 percent by weight based on the amount of diisocyanate.

Inasmuch as the products of the instant invention de-polymerize quantitatively to the monomeric form at about 230° C., they are eminently suitable for use as splitters or camouflaged isocyanates.

The invention is further illustrated, but is not intended to be limited by the following examples in which all parts and percentages are by weight unless otherwise specified.

EXAMPLES

EXAMPLE 1

A mixture of 80% 2,4- and 20% 2,6-toluene diamine was hydrogenated to the cyclohexyl form.

This was done by melting 1,200 g of 80/20 TDA at 110° C. and slurring 50 g of activated charcoal into the TDA for about 10 minutes. The molten TDA was filtered through a celite bed on a steam heated Buchner funnel. 1,000 g of the filtrate were hydrogenated in a 1-gallon autoclave at 4,500 psig for 4 hours. The autoclave was then cooled and depressurized. The liquid product was then filtered.

The three major stereoisomers present were:

(e = equatorial, a = axial):
(x) 4-e-$NH_2$; 2-e-$NH_2$ 49.4%
(y) 4-a-$NH_2$; 2-e-$NH_2$ 17.3%   } 78.7%
(z) 6-e-$NH_2$; 2-e-$NH_2$ 12.0%

Note that isomers in which both $NH_2$ are equatorial or axial (cis structure) total 61.4%. This mixture of amines was phosgenated in known manner to yield the corresponding isocyanate (46.6% NCO) which was used in most of the following examples.

The formation of the claimed cyclic Nylon-1 structure in the following Examples (2–12) was confirmed by IR, which showed a distinctly different spectrum than was obtained by linear Nylon-1 or isocyanurate structures.

EXAMPLE 2

300 g of the isocyanate of Example 1 and 4.5 g of lead octoate were placed in a 500 ml 3-necked flask padded with $N_2$ and heated at 120°–145° C. After about one hour the viscosity had increased to the point where 200 g xylene were added. At this point the NCO content of the solution was 11.4%. Heating was continued at 110°–125° C. for an additional 4 hours, after which the NCO content was still 11.4%, indicating that the desired reaction had occurred within the first hour. The monomer content of this solution was found to be 25%, which would in itself account for 0.25×46.6% or 11.6% of the unreacted NCO, indicating that the polymer must be fairly high in molecular weight and essentially low in NCO terminal groups. The 25% monomer content of the solution corresponds to 41.6% unreacted monomer based on the original isocyanate charged, indicating that 41.6% of the isomers present in the isocyanate did *not* polymerize under these conditions.

The xylene solution was diluted with an additional 500 ml xylene and then 1,500 ml heptane were slowly added with stirring to precipitate the polymer. The polymer was filtered, washed with 5,000 ml heptane and dried in a 100° C. vacuum oven (A). The combined filtrate and washings were concentrated and distilled to yield a distillate (B) and a pot residue (C):

|  |  |  |  |
|---|---|---|---|
| 2-A | 173.5 g | 57.8% | (polymer) |
| 2-B | 94.0 g | 31.3% | } (monomer) |
| 2-C | 15.0 g | 5.0% |  |
| Total recovered | 282.5 g | 94.1% |  |

Subsequent examination of the 2-A polymer revealed the following:

| | |
|---|---|
| Melting point (by differential thermal analysis - DTA) | 253° C. |
| Decomposition temperature (by DTA) | about 290° C. |
| Molecular weight | 5,300 (the NCO content if terminated with NCO groups 1.6%) |
| Actual % NCO found | 0.4% |
| Monomer content | <0.1% |

The 2-A polymer was readily soluble (33% solution) in methylene chloride, xylene and diethyl benzene, but essentially insoluble in triethylbenzene, heptane or hexane.

EXAMPLE 3

5 g of polymer 2-A were placed in micro distillation equipment and heated to a pot temperature of about 230° C. under 2 mm pressure. The product decomposed and distilled over at a head temperature of about 132° C. This was repeated four more times and the five distillates (3-A) combined. Examination of the distillate revealed an NCO content of 46.0% and IR spectrum very similar to that of hydrogenated TDI, demonstrating:

(1) that the polymer could be broken down by vacuum distillation into the original monomer, and (2) this process could be used to separate the reactive stereoisomers (ee and aa), sample 2-A, from the non-reactive (e,a and a,e), sample 2-B.

EXAMPLE 4

Since the essentially NCO free polymer was capable of regenerating monomer at elevated temperature, it should be possible to use the polymer as a "camouflaged" isocyanate or isocyanate "splitter".

3.4 g of Multron R-12 (available from Mobay Chemical Corporation), a branched liquid polyester prepared from 1,3-butanediol, trimethylolpropane, adipic acid and maleic acid so as to have an OH number of 165, was mixed with 1.0 g of polymer 2-A and 4.0 g xylene. The resulting solution was cast onto an aluminum sheet. The solvent evaporated and the lacquer film baked under various conditions.

| | |
|---|---|
| 15 minutes at 130° C. | } No significant changes |
| 25 minutes at 150° C. | |
| 15 minutes at 175° C. | |
| 30 minutes at 200° C. | A hard, tough film was produced. |

This demonstrates that the 2-A polymer can react with OH-containing materials only at elevated temperatures.

EXAMPLE 5

1.76 g of a diamine $H_2N$—$C_2H_4$—$O$—$C_2H_4$—$O$—$C_2H_4$—$NH_2$ and 2.0 g of polymer 2-A are dissolved in 8.0 g of xylene and cast onto an aluminum sheet. After evaporation of the xylene, the film exists as a viscous layer. Baking for 15 minutes at 175° C. causes a darkening and an increase in viscosity. Continued baking for 15 minutes at 200° C. causes the liquid film to turn to a dark, tacky thermoplastic solid at 200° C., which turns to a hard tough film upon cooling to room temperature.

EXAMPLE 6

A sample of hydrogenated TDI (46.4% NCO) was prepared from hydrogenated amine. 100 g of the isocyanate and 0.7 g of a 50% solution of lead octoate in xylene were heated in a flask at 125°–140° C. Within one hour a pronounced increase in viscosity occurred, so 66.7 g of xylene were added. The NCO content of this solution was 11.1%, equivalent to 18.5%-NCO on a solvent-free basis indicating that $18.5 \div 46.4$ or 39.8% of the NCO was nonreactive (compared to 41.6% in Example 2).

EXAMPLE 7

Same as Example 6 except 0.2 g of lead acetate were used. The xylene was added after 3 hours of heating at 115°–135° C., and the NCO content of the resulting solution was 11.6% NCO (compared to 11.1% in Example 6).

EXAMPLE 8

A sample of TDA was hydrogenated, then phosgenated to yield a diisocyanate of 45.6% NCO content. 50 g were placed in a 3-necked flask with 0.5 g lead octoate and heated at 110°–120° C. After 30 minutes the viscosity increased and 50 g of xylene were added. The NCO content of the resulting solution was 13.0%. Heating was resumed for 3 more hours, after which the NCO content was 10.1%. This corresponds to 20.2% NCO on a xylene free basis, signifying that $20.2 \div 45.6$ or 44.3% of the original NCO remain unreacted.

The solution was diluted with 100 ml xylene and 2,000 ml of hexane were slowly added with stirring to precipitate the polymer, which was filtered, washed and dried. The yield was 26 g, a yield of 52% based on the original isocyanate charged.

EXAMPLE 9

100 g of the isocyanate of Example 1 and 0.1 g $NaOCH_3$ were placed in a 3-necked flask and heated at 110°–145° C. Within 30 minutes the viscosity increased and 67 g of xylene were added. The NCO content of the resulting solution was 11.4%, and IR spectra indicated the same cyclic Nylon-1 structure obtained in Examples 2, 6, 7 and 8.

EXAMPLE 10

5 g portions of various isocyanates were sealed into dry 16 ml vials along with 0.07 g of lead octoate and heated in a 75° C. oven for 4 hours:

| Isocyanate Used | Appearance After 4 hours at 75° C. | IR Spectra |
|---|---|---|
| Ex 1 | very viscous | Nylon-1 structure |
| Ex 2-B | no change | isocyanate; no reaction |
| Cyclohexyl isocyanate | no change | isocyanate; no reaction |
| 1,6-hexane diisocyanate | low viscosity | some isocyanurate |

This demonstrates that only certain isomers present in Example 1 are capable of forming the peculiar cyclic Nylon-1 structure. The unreactive distillate obtained in Example 2-B was still non-reactive, as was pure cyclohexyl isocyanate. A typical alkyl isocyanate forms conventional isocyanurate rather than the Nylon-1 structure.

EXAMPLE 11

1,000 g of the isocyanate of Example 1 and 5 g of dimethyl aminoethanol were placed in a 3-necked flask and heated for two hours at 125° C. At the end of the day, the material was allowed to stand overnight at room temperature. The next morning an additional 5 g of catalyst were added and heating resumed. After two more hours, the contents were observed to be dark colored and viscous. The NCO content was 24.4%, indicating that only $46.7 \div 24.4$ or 52% of the original NCO groups remained unreacted.

EXAMPLE 12

200 g of hydrogenated 2,4-tolylene diisocyanate were dissolved in 200 g of xylene and reacted in the presence of 0.15 g of DABCO TMR-2 (a tertiary amine manufactured by Air Products). After stirring for two hours at room temperature, no reaction was noticeable. The mixture was then heated from about 70° to 102° C. for about 5 hours and then a sample was tested for NCO content. The NCO content was 44.5%. About 0.3 g of DABCO TMR-2 was added at about 80° C. The mixture was then allowed to cool overnight at room temperature. A sample was taken in the morning and the NCO content was 32.64%. The mixture was then treated at about 77°–96° C. for 6 hours. The final sample at the end of this time had an NCO content of 30.55%.

What is claimed is:

1. A process for the separation of substantially pure cycloaliphatic diisocyanate reactive (cis-form) stereoisomers from cycloaliphatic diisocyanate non-reactive (transform) stereoisomers comprising the steps of:
   (a) reacting:
   (1) cycloaliphatic diisocyanates of the formula

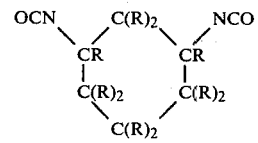

where R is hydrogen or an aliphatic hydrocarbon group having from 1 to 4 carbon atoms, at least one of said R's being an aliphatic hydrocarbon having from 1 to 4 carbon atoms and wherein the isocyanato groups are both positioned axially or equatorially in the presence of
   (2) catalysts selected from the group consisting of lead catalysts, tertiary amines, alkali metal hydroxides, and sodium methoxide thereby producing a cyclic nylon-1 type linear polymer having regularly reoccuring bicyclic structural units of the formula

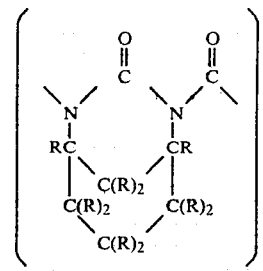

(b) precipitating said cyclic nylon-1 type linear polymers;
(c) filtering and washing said precipitated cyclic nylon-1 type linear polymers;
(d) decomposing said precipitated polymer using distillation thereby producing a distillate;
(e) collecting said distillate containing a substantially pure monomer consisting of reactive (cis-form) stereoisomers.

2. A process as claimed in claim 1, wherein step (d) is performed under conditions of reduced pressure.